United States Patent
Wang et al.

(10) Patent No.: US 10,516,437 B2
(45) Date of Patent: Dec. 24, 2019

(54) SIGNAL TRANSMISSION METHOD OF WIRELESS COMMUNICATION SYSTEM, BASE STATION AND USER EQUIPMENT

(71) Applicant: NTT DoCoMo, Inc., Tokyo (JP)

(72) Inventors: Xin Wang, Beijing (CN); Xiaolin Hou, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 16/070,298

(22) PCT Filed: Jan. 17, 2017

(86) PCT No.: PCT/CN2017/071346
§ 371 (c)(1),
(2) Date: Jul. 16, 2018

(87) PCT Pub. No.: WO2017/124994
PCT Pub. Date: Jul. 27, 2017

(65) Prior Publication Data
US 2019/0028142 A1    Jan. 24, 2019

(30) Foreign Application Priority Data

Jan. 18, 2016  (CN) .......................... 2016 1 0029192

(51) Int. Cl.
*H04B 1/00* (2006.01)
*H04B 1/7107* (2011.01)
(Continued)

(52) U.S. Cl.
CPC ............. *H04B 1/7107* (2013.01); *H04B 7/04* (2013.01); *H04B 7/0456* (2013.01); *H04B 7/06* (2013.01);
(Continued)

(58) Field of Classification Search
CPC ................ H04B 1/7115; H04B 1/7117; H04B 2201/709709; H04B 1/7102; H04L 27/0012
(Continued)

(56) References Cited

U.S. PATENT DOCUMENTS 8,600,323 B2    12/2013  Wu
8,760,330 B2 *   6/2014  Ritter ................... H03M 3/368
                                                          341/143
(Continued)

FOREIGN PATENT DOCUMENTS

CN           1992701 A       7/2007
CN         101547036 A       9/2009
(Continued)

OTHER PUBLICATIONS

International Search Report for PCT/CN2017/071346, ISA/CN, Haidian District, Beijing, dated Apr. 12, 2017, with English translation thereof.
(Continued)

*Primary Examiner* — Khai Tran
(74) *Attorney, Agent, or Firm* — Harness, Dickey & Pierce, P.L.C.

(57) ABSTRACT

Embodiments of the invention provide a signal transmission method of a wireless communication system, the method comprising: selecting a phase compensation value for a k-th layer of user data of the wireless communication system, performing, according to the phase compensation value, phase rotation on a reference signal in the k-th layer user data, so that a signal power of the reference signal, after performing interference mitigation thereon at a transmission end, does not exceed a predetermined power threshold, wherein, k is selected from 1 to M, and M is less than or equal to K, and K is the total number of layers of user data
(Continued)

of the wireless communication system; and transmitting, through a wireless channel, the reference signal after the phase rotation.

19 Claims, 8 Drawing Sheets

(51) Int. Cl.
    *H04B 7/04*     (2017.01)
    *H04B 7/06*     (2006.01)
    *H04B 17/318*     (2015.01)
    *H04B 7/0456*     (2017.01)
    *H04L 5/00*     (2006.01)
    *H04L 25/497*     (2006.01)
    *H04B 7/0452*     (2017.01)

(52) U.S. Cl.
    CPC ......... *H04B 17/318* (2015.01); *H04L 5/0048* (2013.01); *H04L 25/4975* (2013.01); *H04B 7/0452* (2013.01); *H04B 2001/71077* (2013.01)

(58) Field of Classification Search
    USPC ........ 375/148, 130, 260, 269, 346; 340/143, 340/155
    See application file for complete search history.

(56) References Cited

U.S. PATENT DOCUMENTS

| | | |
|---|---|---|
| 8,885,746 B2 | 11/2014 | Moulsley et al. |
| 2004/0057532 A1* | 3/2004 | Kim .................. H04L 25/03267 375/286 |
| 2011/0085587 A1 | 4/2011 | Moulsley et al. |
| 2011/0281537 A1 | 11/2011 | Wu |
| 2016/0269219 A1 | 9/2016 | Wang et al. |

FOREIGN PATENT DOCUMENTS

| | | |
|---|---|---|
| CN | 102549940 A | 7/2012 |
| EP | 2091198 A2 | 8/2009 |
| JP | 2009194732 A | 8/2009 |
| JP | 2009290449 A | 12/2009 |
| WO | WO-2011042847 A2 | 4/2011 |
| WO | WO-2011140262 A1 | 11/2011 |
| WO | WO-2015058357 A1 | 4/2015 |

OTHER PUBLICATIONS

Written Opinion of the ISA for PCT/CN2017/071346, ISA/CN, Haidian District, Beijing, dated Apr. 12, 2017.

Min Huang, et al., Analysis of Tomlinson-Harashima Precoding in Multi user MIMO System With Imperfect Channel State Information, IEEE Transactions on Vehicular Technology, vol. 57, No. 5, Sep. 16, 2008, pp. 2856-2867.

European Search Report from counterpart European Application No. 17741025.5, dated Jul. 4, 2019.

Office Action in related application JP 2018-555810, JPO, dated Aug. 13, 2019, with partial English translation attached.

* cited by examiner

SIGNAL TRANSMISSION METHOD OF WIRELESS COMMUNICATION SYSTEM, BASE STATION AND USER EQUIPMENT

CROSS-REFERENCE TO RELATED APPLICATIONS

This application is a 371 U.S. National Stage of International Application No. PCT/CN2017/071346, filed on Jan. 17, 2017, which claims priority to Chinese Application No. 201610029192.8, filed on Jan. 18, 2016. The entire disclosures of the above applications are incorporated herein by reference.

FIELD

The present application relates to communication technology, and particularly to a signal transmission method of a wireless communication system, base station, user equipment.

BACKGROUND

A wireless communication system, made up of a transmitting end, a receiving end and a wireless channel, transmits various signals using electromagnetic waves. At present, wireless communication systems have gradually evolved from the first, second, third, and fourth generations to the fifth generation (5G), and more types of wireless communication systems may emerge in the future. With developments in the technology, wireless communication systems are becoming more and more competent in supporting -multi-user transmissions. During the multi-user transmissions, interference between different users also appears. Regardless of whether the system is time division, frequency division, space division or code division, the presence of multi-layer user data results in interference between user data of different layers, and the interference may affect the restoration of signals at the receiving end. Therefore, there is increasing need for interference cancellation in wireless communication systems.

SUMMARY

Embodiments of the present application provide a signal transmission method of a wireless communication system, a base station and a user equipment (UE), to make a to-be-transmitted signal satisfy a power control requirement while applying interference cancellation to the signal.

Embodiments provide a signal transmission method of a wireless communication system. The method may include:

selecting a phase compensation value for user data of a k-th layer in the wireless communication system, applying phase rotation to a reference signal in the user data of the k-th layer using the phase compensation value to make the reference signal processed through interference cancellation on a transmitter side have a signal power within a pre-defined power threshold, wherein k is selected from 1 to M, M is smaller than or equal to K; K is the total number of layers of user data in the wireless communication system; and transmitting the reference signal processed through the phase rotation via a wireless channel.

Embodiments provide a program. The program is capable of causing a computer to:

select a phase compensation value for user data of a k-th layer in the wireless communication system, apply phase rotation to a reference signal in the user data of the k-th layer using the phase compensation value to make the reference signal processed through interference cancellation on a transmitter side have a signal power within a pre-defined power threshold, wherein k is selected from 1 to M, M is smaller than or equal to K; K is the total number of layers of user data in the wireless communication system; and transmit the reference signal processed through the phase rotation via a wireless channel.

Embodiments provide a non-transitory machine-readable storage medium. The storage medium stores machine-readable instructions executable by a processor to:

select a phase compensation value for user data of a k-th layer in the wireless communication system, apply phase rotation to a reference signal in the user data of the k-th layer using the phase compensation value to make the reference signal processed through interference cancellation on a transmitter side have a signal power within a pre-defined power threshold, wherein k is selected from 1 to M, M is smaller than or equal to K; K is the total number of layers of user data in the wireless communication system; and transmit the reference signal processed through the phase rotation via a wireless channel.

Embodiments provide a base station. The base station may include: a processor; non-transitory machine-readable storage medium; a program module stored in the non-transitory machine-readable storage medium and capable of being executed by the processor; and a transmitting unit;

wherein the program module is configured to:

select a phase compensation value for user data of a k-th layer in the base station; wherein k is within 1 to M, M is smaller than or equal to K; K is the total number of layers of user data in the wireless communication system; and apply phase rotation to a reference signal in user data of the k-th layer using the phase compensation value to make the reference signal processed through interference cancellation on a transmitter side have a signal power within a pre-defined power threshold; and modulate a data signal in the user data of the k-th layer using the phase compensation value;

the transmitting unit is configured to: transmit the reference signal processed through the phase rotation and the modulated data signal.

Embodiments provide a UE. The UE may include: a processor; non-transitory machine-readable storage medium; a program module stored in the non-transitory machine-readable storage medium and capable of being executed by the processor; and a transmitting unit;

wherein the program module is configured to:

select a phase compensation value for user data of the k-th layer in the UE, apply phase rotation to a reference signal in the user data of the k-th layer to make the reference signal processed through interference cancellation have a signal power within a pre-defined power threshold; wherein k is within 1 to M, M is smaller than or equal to K; K is the total number of layers of user data in the wireless communication system; and the transmitting unit is configured to: transmit the reference signal processed through the phase rotation.

Embodiments provide a base station. The base station may include:

a phase searching module, to select a phase compensation value for user data of a k-th layer in the base station to make a reference signal in the user data of the k-th layer processed through phase rotation using the phase compensation value and interference cancellation have a signal power within a pre-defined power threshold; wherein k is within 1 to M, M is smaller than or equal to K; K is the total number of layers of user data in the base station;

a phase rotating module, to apply phase rotation to the reference signal in the user data of the k-th layer using the phase compensation value;

an interference canceling module, to apply interference cancellation to the reference signal processed through the phase rotation;

a power checking module, to judge whether the reference signal after the interference cancellation has a signal power exceeding the pre-defined power threshold, and informing the phase searching module of a judging result;

a modulating module, to modulate a data signal in the user data of the k-th layer using the phase compensation value; and a transmitting unit, to transmit the reference signal processed through the phase rotation and the modulated data signal.

Embodiments provide a UE. The UE may include:

a phase searching module, to select a phase compensation value for user data of a k-th layer in the UE to make a reference signal in the user data of the k-th layer processed through phase rotation using the phase compensation value and interference cancellation have a signal power within a pre-defined power threshold; wherein k is within 1 to M, M is smaller than or equal to K; K is the total number of layers of user data in the base station;

a phase rotating module, to apply phase rotation to the reference signal in the user data of the k-th layer using the phase compensation value;

an interference canceling module, to apply interference cancellation to the reference signal processed through the phase rotation;

a power checking module, to judge whether the reference signal processed through the interference cancellation has a signal power exceeding the pre-defined power threshold, and informing the phase searching module of a judging result; and a transmitting unit, to transmit the reference signal processed through the phase rotation.

DETAILED DESCRIPTIONS

This application is hereinafter further described in detail with reference to the accompanying drawings as well as embodiments so as to make the objective, technical solution and merits thereof more apparent.

Various embodiments of the present application provide a signal transmission method in a wireless communication system. When applying interference cancellation on a transmitter side to a reference signal in user data, the signal power of the reference signal processed through interference cancellation can be kept within a proper range, e.g., within a pre-defined power threshold, by performing phase rotation to implement power control. According to an example, the wireless communication system may be a Multi-User Multiple-Input Multiple-Output (MU-MIMO) system, e.g., a high-rank MU-MIMO system. According to an example, the wireless communication system may also be a multi-user Code Division Multiple Access (CDMA) system, or a single-user multi-data flow system, or another wireless access network which requires interference cancellation (e.g., cancellation of inter-user interference or inter-layer interference, or the like).

Figure 1:
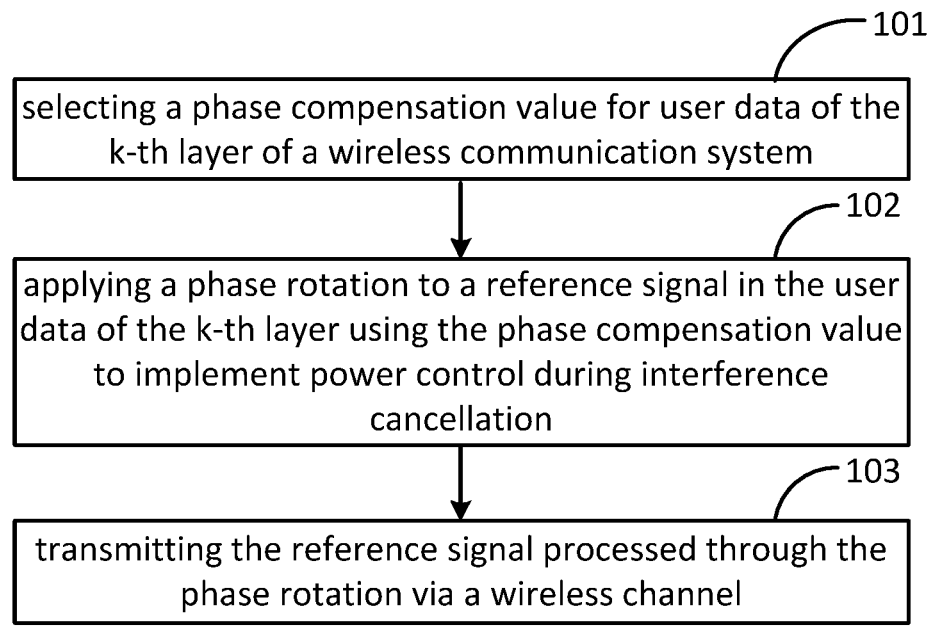
FIG. 1 is a flowchart of a signal transmission process in accordance with embodiments of the present application.

FIG. 1 is a flowchart of a signal transmission process in accordance with embodiments of the present application. The method may include the following procedures.

At step 101, a phase compensation value may be selected for user data of the k-th layer in a wireless communication system.

In an example, the phase compensation value is for adjusting or modifying the phase of user data of the k-th layer. In an example, k may be selected from 1 and M. M is smaller than or equal to K. K is the total number of layers of user data in the wireless communication system. In an example, user data of the K layers may correspond to K users, and user data of each layer is transmitted for one user. User data in each layer is referred to as a data flow. It should be noted that user data of a first layer and user data of a second layer may be regarded as two data flows independent from each other, and may cause interference to each other. In another example, user data of the K layers may correspond to P users (P<K), i.e., a plurality of layers of user data may be transmitted for one user.

In an example, user data of each layer may include a type of signal, i.e., reference signal. In an example, the reference signal is a signal known to both a transmitting end and a receiving end. After sent to a receiving end by a transmitting end, the reference signal may be used by the receiving end for channel estimation of the wireless channel between the transmitting end and the receiving end. In an example, the reference signal may be a Demodulation Reference Signal (DMRS). In another example, the reference signal may be a Sounding Reference Signal (SRS).

In an example, user data on each layer may include two types of signals, i.e., reference signal and data signal. According to an example, a data signal is the signal that the transmitting end actually expects to provide to the receiving end. Content of the data signal is unknown to the receiving end. The receiving end requires the result of the channel estimation for correctly recovering the data signal. In an example, processing of signals, e.g., a data signal, a reference signal, or the like, may be carried out in unit of symbol.

At step 102, phase rotation may be applied to a reference signal in user data of the k-th layer using the phase compensation value, so as to implement power control during interference cancellation.

In an example, after phase rotation is applied to the reference signal, it is required that the reference signal after interference cancellation on a transmitter side has a signal power within a pre-defined power threshold. That is, it is necessary to find for the reference signal a phase compensation value which satisfies a power control requirement.

At step 103, the reference signal processed through the phase rotation may be transmitted via the wireless channel.

In an example, in the M layers of user data, user data of each layer may be processed through the procedures in the above steps 101-103, and the reference signal in the user data of each layer may have a phase compensation value. In an example, when M is smaller than K, signal transmission may be performed for M users according to the method of various embodiments, i.e., applying power control to a reference signal using phase rotation, and power control to a data signal using a modulo operation. For the other (K-M) users, signals of the users may be processed through a linear coding mechanism, e.g., zero-forcing algorithm, or the like, before transmission. According to various embodiments, the capital letter K represents the total number of layers of user data, the lowercase k represents user data of a certain layer among the K layers, i.e., K and k have different meanings.

Figure 2:
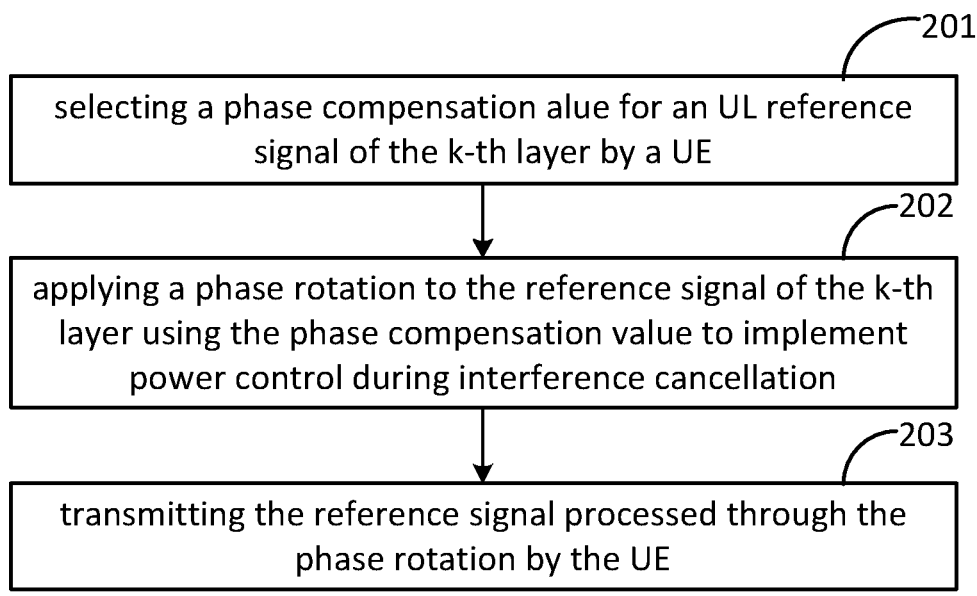
FIG. 2 is a flowchart of a signal transmission process performed at a UE in accordance with embodiments of the present application.

FIG. 2 is a flowchart of a signal transmission process performed by user equipment (UE) in accordance with embodiments of the present application.

At step 201, a UE may select a phase compensation value for an uplink (UL) reference signal of the k-th layer.

At step 202, the reference signal of the k-th layer may be processed through phase rotation using the phase compensation value to make the reference signal processed through interference cancellation on a transmitter side have a signal power within a pre-defined power threshold.

At step 203, the UE may transmit the reference signal processed through phase rotation.

In an example, the reference signal may be SRS. In an example, k may be selected from 1 to K. K is the total number of layers of uplink reference signals in the wireless communication system. Accordingly, the UE may have at least K transmitting antennae for transmitting the K layers of reference signals. For example, the UE may have T transmitting antennae, and T is larger than or equal to K. In an example, the procedures of the above steps 201-203 may be applied to some uplink reference signals in the wireless communication system, i.e., k may be selected from 1 to M, M<K.

Figure 3:
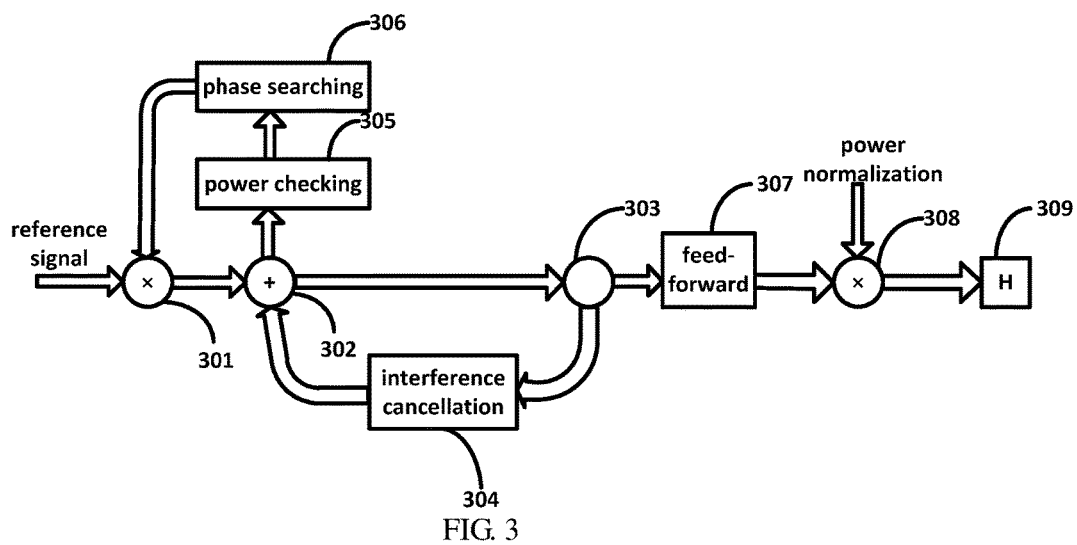
FIG. 3 is a schematic diagram illustrating precoding reference signals before transmission by a UE in accordance with embodiments of the present application.

FIG. 3 is a schematic diagram illustrating a process of precoding and transmitting a reference signal performed by a UE in accordance with embodiments of the present application. At step 301, an original reference signal may be processed through phase rotation using a phase compensation value provided by a phase searching module 306 to obtain a corrected reference signal. At step 302, a feedback interference signal provided by an interference canceling module 304 may be removed from the corrected reference signal to obtain an output reference signal. The output reference signal may be provided respectively to the interference removing module 304 and the feedforward processing module 307 at step 303. In an example, the interference canceling module 304 may store the output reference signal of each layer for feeding back the accumulated interference from the first layer to the (k–1)-th layer to facilitate processing of the reference signal of the k-th layer.

The feedforward processing module 307 may process the output reference signal through feedforward to obtain a reference signal after the feedforward processing. In an example, the transposition of an UL channel H may be processed through QR decomposition to obtain a matrix Q and a matrix S, as shown in formula (1). The matrix Q, serving as a feedforward processing matrix, may be multiplied by the output reference signal to obtain the reference signal after the feedforward processing. In an example, Q may be a unitary matrix.

$$H^H = QS^H \tag{1}$$

At step 308, the reference signal after the feedforward processing may be processed through power normalization, and transmitted through the uplink channel H at step 309.

The power checking module 305 may determine whether the output reference signal generated at step 305 exceeds a threshold, and provide a judging result to the phase searching module 306. The phase searching module 306 may select a phase compensation value for the reference signal of each layer, and decide whether to re-select a phase compensation value for the reference signal of a certain layer based on the judging result provided by the power checking module 305.

Figure 4:
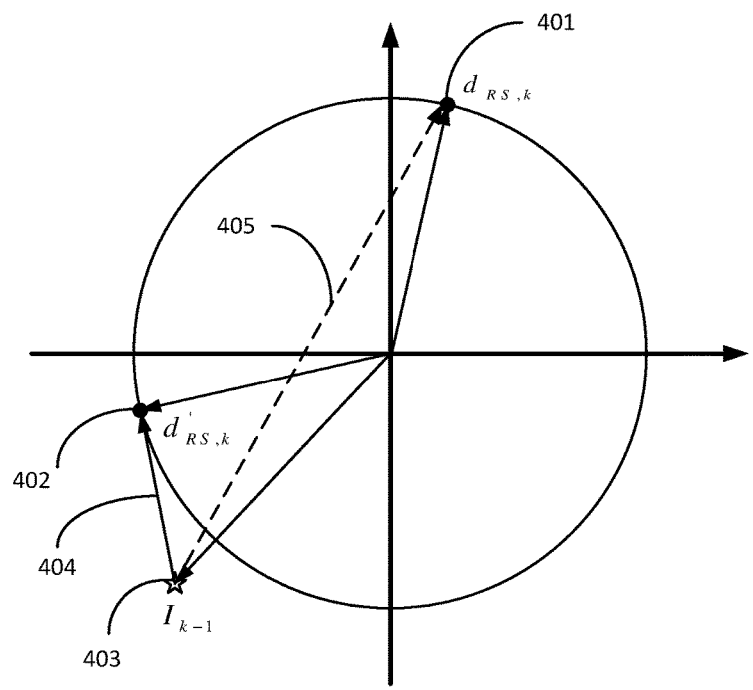
FIG. 4 is a schematic diagram of vectors illustrating applying phase rotation before interference cancellation to a reference signal in accordance with embodiments of the present application.

FIG. 4 is a schematic diagram of vectors illustrating applying phase rotation before interference cancellation to a reference signal in accordance with embodiments of the present application. In an example, the interference cancellation may be performed according to formula (2).

$$x_{RS,k} = d_{RS,k} e^{j\theta_k} - \sum_{l=1}^{k-1} B_{k,l} x_{RS,l} \tag{2}$$

In the formula, $x_{RS,k}$ is the output reference signal 404 after interference cancellation and phase adjustment. $d_{RS,k}$ is the original reference signal 401 of the k-th layer, e.g., the to-be-transmitted reference signal of the k-th user, which is a signal planned by the UE and the base station. $d'_{RS,k} = d_{RS,k} e^{j\theta_k}$ is the corrected reference signal 402 of the k-th layer, and $\theta_k$ is the phase compensation value of the reference signal of the k-th layer.

$$I_{k-1} = \sum_{l=1}^{k-1} B_{k,l} x_{RS,l}$$

is the feedback interference signal 403. For the reference signal of the k-th layer, the feedback interference signal 403 is the accumulated interference which is suffered by the reference signal of the k-th layer and caused by reference signals from the first layer to the (k−1)-th layer. $B_{k,l}$ is an element in the k-th row and the l-th column of a feedback processing matrix B. The matrix B may be obtained from calculation according to formulae (3) and (4).

$$G = \text{diag}(S_{1,1}^{-1}, L, S_{K,K}^{-1}) \qquad (3)$$

$$B = GS \qquad (4)$$

It should be noted that, in formula (3), $S_{k,k}$ is an element in the k-th row and the k-th column of matrix S which is obtained from calculation according to formula (1). In an example, after the matrices S and G are obtained according to formulae (1) and (3), matrix B may be obtained according to formula (4).

It can be seen that, since there is a big phase difference between the original reference signal 401 and the feedback reference signal 403, the second output signal 405 processed through interference cancellation without phase adjustment has an increased signal power. In contrast, the difference between the corrected reference signal 402 and the feedback interference signal 403, i.e., the output reference signal 404, does not have obvious power divergence.

Figure 5:
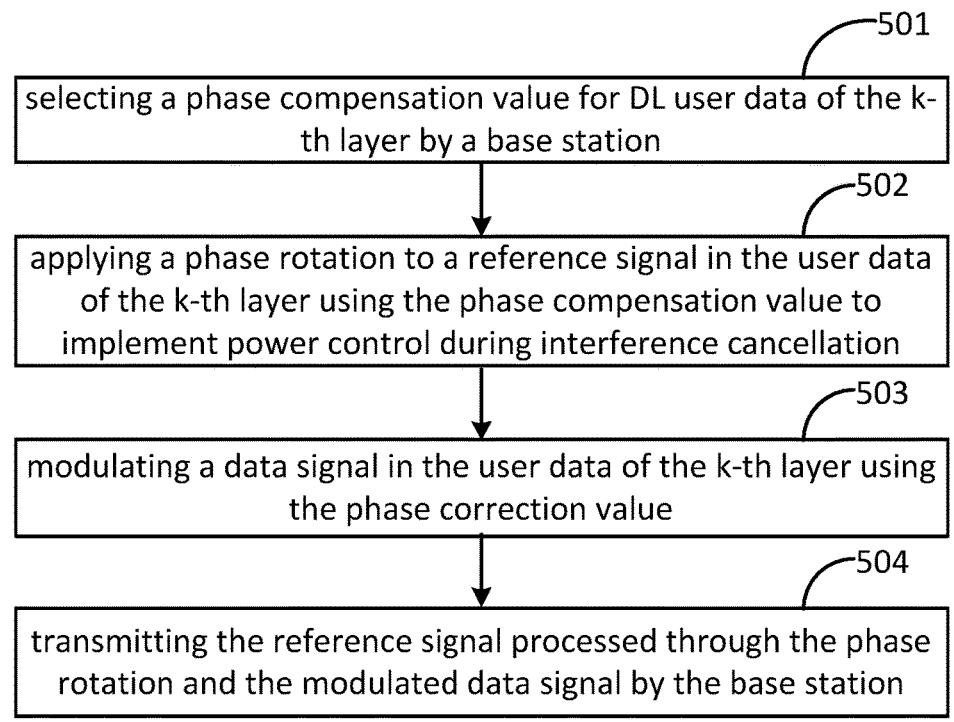
FIG. 5 is a flowchart illustrating a signal transmission method performed by a base station in accordance with embodiments of the present application.

FIG. 5 is a flowchart of a signal transmission process performed by a base station in accordance with embodiments of the present application. The method may include the following procedures.

At step 501, a base station may select a phase compensation value for downlink (DL) user data of the k-th layer. k may be selected from 1 to M. M is smaller than or equal to K. K is the total number of layers of user data transmitted by the base station.

At step 502, the reference signal in user data of the k-th layer may be processed through phase rotation using the phase compensation value to make the reference signal processed through interference cancellation on a transmitter side have a signal power within a pre-defined power threshold.

At step 503, a data signal in the user data of the k-th layer may be modulated using the phase compensation value. It can be seen that, a reference signal and a data signal which belong to user data of the same layer may be processed using the same phase compensation value during precoding.

At step 504, the base station may transmit the reference signal processed through the phase rotation and the modulated data signal.

In an example, the reference signal may be DMRS. In an example, the K layers of user data may correspond to K users. The procedures in steps 501-504 may be performed for each user to select a phase compensation value for each user and to apply phase rotation and interference cancellation to the reference signal and the data signal of each user.

Figure 6:
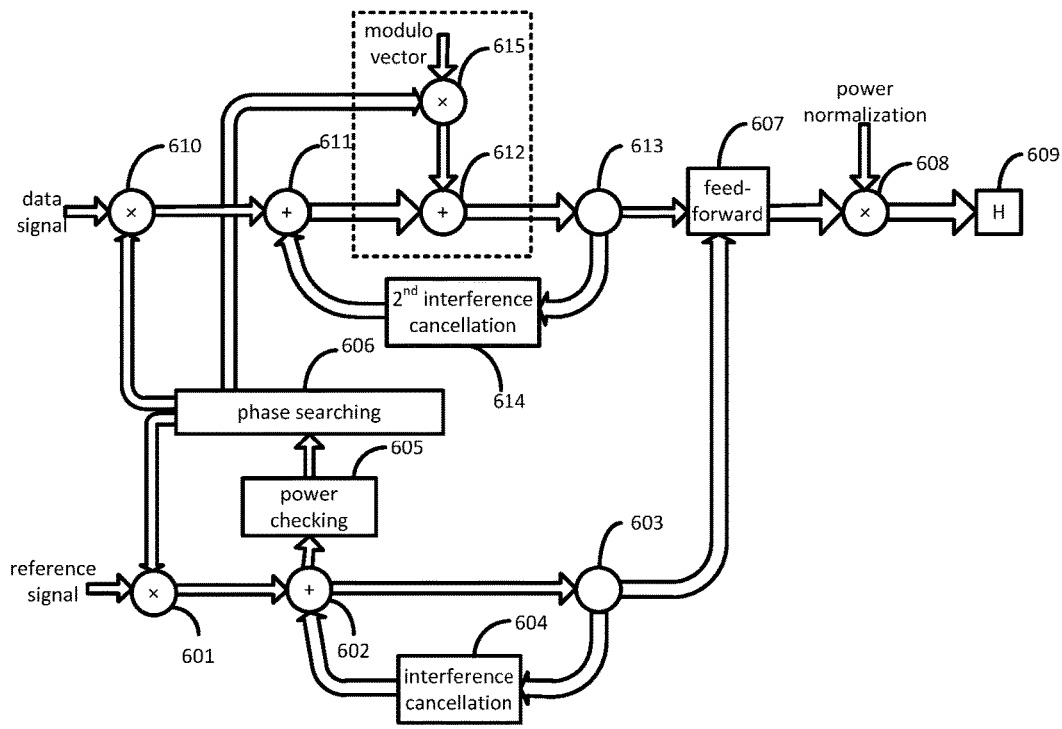
FIG. 6 is a schematic diagram illustrating a process of precoding and transmitting a data signal and a reference signal by a base station in accordance with embodiments of the present application.

FIG. 6 is a schematic diagram illustrating a process of precoding and transmitting a data signal and a reference signal by a base station in accordance with embodiments of the present application. In multi-user environment, precoding may function to: decouple signals of different UEs during signal transmission to suppress or eliminate the interference in the received signal of each UE; make a transmitted beam of each UE match the channel vector of the UE to increase the effective signal power received by each UE.

At step 601, an original reference signal of the k-th layer may be processed through phase rotation using a phase compensation value provided by the phase searching module 606 to obtain a corrected reference signal of the k-th layer. At step 602, a first interference signal provided by the interference canceling module 604 may be removed from the corrected reference signal to obtain an output reference signal. The output reference signal may be provided respectively to the interference removing module 604 and the feedforward processing module 607 at step 603. The reference signal after the feedforward processing generated by the feedforward processing module 607 may be processed through power normalization at step 608, and then transmitted through the DL channel H at step 609. In an example, when a base station has a total of K downlink data flows, and is configured with T transmitting antennae, the matrix H has a dimension of K×T. The reference signal vector $x_{RS}$ of the base station may be defined according to formula (5). In an example, when K is smaller than T, the vector $x_{RS}$ may be converted into a column vector with a dimension of T×1 through zero-filling.

$$x_{RS} = \begin{bmatrix} x_{RS,1} \\ M \\ x_{RS,K} \\ 0 \\ M \\ 0 \end{bmatrix} \qquad (5)$$

In an example, through the feedforward processing 607 and the power normalization 608, the transmitted reference signal $y_{RS}$ may be as shown in formula (6). $P_{tx}$ is a power normalization factor.

$$y_{RS} = \frac{1}{\sqrt{P_{tx}}} Q x_{RS} \qquad (6)$$

The power checking module 605 may determine whether the output reference signal generated at step 602 exceeds a threshold, and provide a judging result to the phase searching module 606. The phase searching module 606 may select a phase compensation value for user data of each layer, and decide whether to re-select a phase compensation value for the user data of a certain layer based on the judging result provided by the power checking module 605. In an example, when the signal power of the output reference signal of the k-th layer exceeds a pre-defined threshold, the phase searching module 606 may re-select for the user data of the k-th layer a phase compensation value that has not been tried, and perform the procedures in steps 601-606 again. It should be noted that the output reference signal of the k-th layer may be obtained from calculations according to formula (1), which is not elaborated herein.

For a data signal, at step 610, an original data signal of the k-th layer may be processed through phase rotation using a phase compensation value provided by the phase searching module 606 to obtain a corrected data signal. At step 611, a second interference signal provided by a second interference canceling module 614 may be removed from the corrected data signal to obtain an output data signal. At step 612, the output data signal is processed through a modulo operation, i.e., adding the output data signal to a modulo vector, to obtain a data signal after modulo operation. It should be noted that, at step 615, the modulo vector has been processed through the same phase rotation with that applied to the original data signal using the phase compensation value provided by the phase searching module 606. Further, the data signal after modulo operation may be provided at step 613 to the second interference canceling module 614 and the feedforward processing module 607 respectively.

In an example, the data signal after modulo operation of step 612 may be obtained according to formula (7).

$$x_{Data,k} = d_{Data,k}e^{j\theta_k} + (2\sqrt{\text{Mod}}(p_I + jp_Q)e^{j\theta_k}) - \sum_{l=1}^{k-1} B_{k,l}x_{Data,l} \quad (7)$$

$x_{Data,k}$ is the data signal after modulo operation in the user data of the k-th layer. $d_{Data,k}$ is the original data signal, i.e., the data signal to be transmitted. $\theta_k$ is the phase compensation value of the user data of the k-th layer. Mod is related with the modulation order of $d_{Data,k}$. For example, for Quadrature Phase Shift Keyin (QPSK) modulation, Mod is 4; for 16 Quadrature Amplitude Modulation (16 QAM), Mod is 16. $p_I$ and $p_Q$ are both used in the modulo operation. In an example, $p_I$ and $p_Q$ are both integers, and may be calculated according to a Tomlinson-Harashima Precoding (THP) process. $B_{k,l}$ is an element in the k-th row and the l-th column of a feedback processing matrix B. The matrix B may be obtained by calculation according to formulae (3) and (4).

Data signal vector $x_{Data}$ may be as shown in formula (8). Accordingly, the transmit data signal $y_{Data}$ may be as shown in formula (9).

$$x_{Data} = \begin{bmatrix} x_{Data,1} \\ M \\ x_{Data,K} \\ 0 \\ M \\ 0 \end{bmatrix} \quad (8)$$

$$y_{Data} = \frac{1}{\sqrt{P_{tx}}} Q x_{Data} \quad (9)$$

In an example, when there are a reference signal and a data signal, the power normalization may be implemented as follows. The maximum power of each element in formulae (10) and (11) may be determined according to formula (12). $y'_{RS,k}$ is the k-th element of $y'_{RS}$, and $y'_{Data,k}$ is the k-th element of $y'_{Data}$.

$$y'_{RS} = Qx_{RS} \quad (10)$$

$$y'_{Data} = Qx_{Data} \quad (11)$$

$$P = \max(|y'_{RS,1}|^2, L, |y'_{RS,K}|^2, |y'_{Data,1}|^2, L, |y'_{Data,K}|^2) \quad (12)$$

When the maximum transmitting power of a transmitter is $P_{max}$, the power normalization factor $P_{tx}$ may be as follows:

$$P_{tx} = \frac{P}{P_{max}} \quad (13)$$

When there is only a reference signal, the maximum power P of all elements in only $y'_{RS}$ may be calculated, and then the power normalization factor $P_{tx}$ may be obtained through calculation according to formula (13).

It can be seen that, the modulo operation at step 612 may control the signal power of the data signal in the user data to avoid power amplification of the data signal after interference cancellation. For the reference signal in the user data, however, power control using a modulo operation similar to that in step 612 may damage amplitude information in the reference signal, thus affects the usage of the reference signal in channel estimation. That is, the receiving end cannot effectively perform channel estimation using the reference signal which has been processed through the modulo operation. Hence, various embodiments implement power control of a reference signal through phase rotation of step 601 while performing interference cancellation of the reference signal. That is, during interference cancellation, the reference signal and the data signal in user data are processed through different power control procedures that respectively suit the characteristics of different types of signals in the user data.

Besides, it can be seen from FIG. 6 that, the reference signal is processed through the phase rotation, and the data signal is also processed through the same phase rotation. Specifically, the base station may apply phase rotation to the data signal in the user data of the k-th layer using the phase compensation value of the reference signal in the user data of the k-th layer (as shown in step 610), and also apply the phase rotation to the pre-defined modulo vector using the phase compensation value (as shown in step 615). After that, the base station may utilize the modulo vector processed through the phase rotation to perform a modulo operation on the data signal processed through the phase rotation to obtain the modulated data signal.

Figure 7:
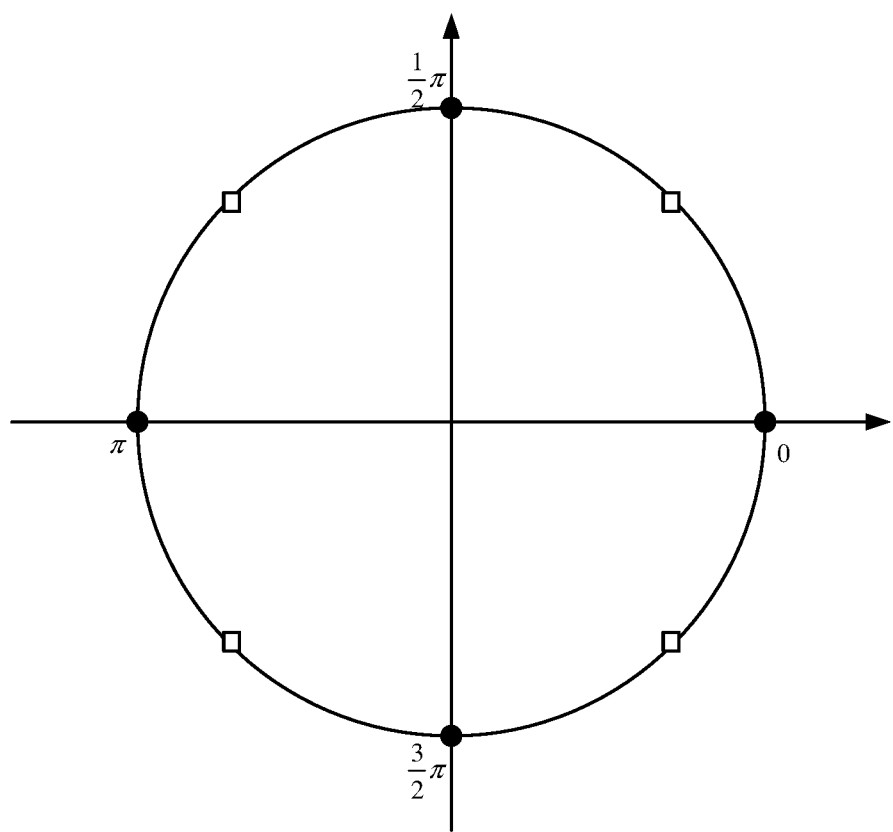
FIG. 7 is a schematic diagram illustrating a candidate phase set in accordance with embodiments of the present disclosure.

The phase compensation value may be selected from a pre-defined set of candidate phases. FIG. 7 is a schematic diagram illustrating a candidate phase set in accordance with embodiments of the present disclosure. For example, the candidate phase set may be In another example, the candidate phase set may be In an example, X candidate phases may be evenly selected from an available phase range to form the candidate phase set. In an example, the available phase range may be 0-2π. In an example, Y candidate phases may be randomly selected from the available phase range to from the candidate phase set, and the candidate phase set may be searched to determine the phase compensation value of the user data of the k-th layer. It can be seen that, the complexity of phase searching can be reduced by determining a candidate phase set and then searching the candidate phase set for a phase compensation value for user data.

Figure 8:
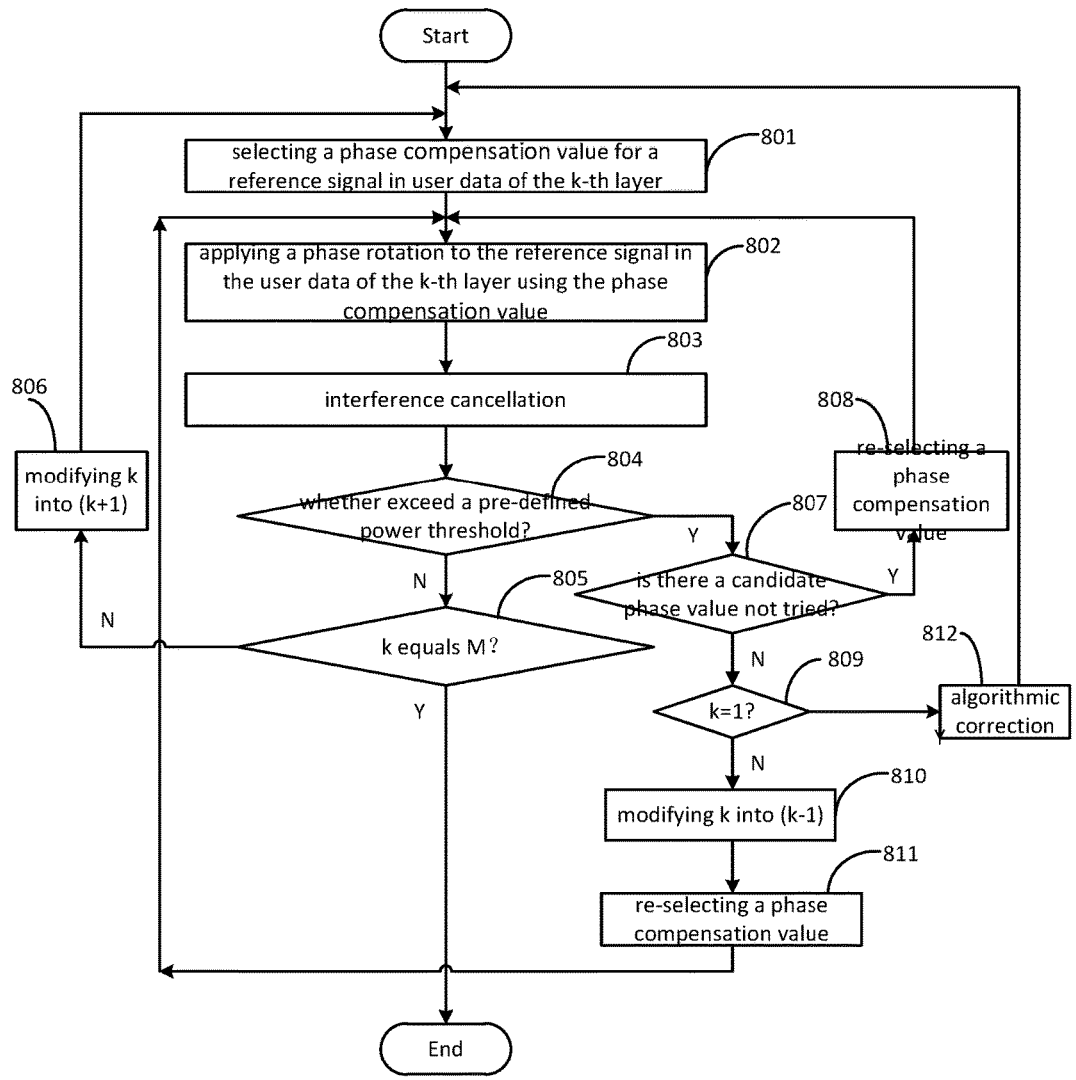
FIG. 8 is a flowchart illustrating a process of phase processing of a reference signal in accordance with embodiments of the present application.

FIG. 8 is a flowchart illustrating a process of phase processing of a reference signal in accordance with embodiments of the present application. The method may include the following procedures. It is supposed there are a total of M layers of user data, and user data of each layer includes a reference signal. A group of phase compensation value $(\theta_1, \ldots, \theta_k, \ldots, \theta_M)$ is to be found out for the group of reference signals to make the output powers of the group of reference signals are all smaller than a threshold.

At step 801, a phase compensation value may be selected for a reference signal in user data of the k-th layer.

At step 802, phase rotation may be applied to the reference signal in the user data of the k-th layer using the phase compensation value. In an example, the procedure in step 802 may be similar to that in step 601.

At step 803, interference suffered by the reference signal in the user data of the k-th layer which is caused by reference signals in user data from the first layer to the (k−1)-th layer in the M layers may be removed. In an example, the procedure in step 803 may be similar to that in steps 602 and 604.

In an example, the interference which is suffered by the user data of the k-th layer and caused by user data in layers from the first layer to the (k−1)-th layer is referred to as accumulated reference.

In step 804, the power checking module 605 may judge whether the power of the reference signal in the user data of the k-th layer after the interference cancellation exceeds the pre-defined power threshold, and perform the procedure in step 805 when the power does not exceed the threshold.

In an example, the power checking in step 804 may include: determining whether the square of the modulus of the reference signal $x_{RS,k}$ processed through interference cancellation is smaller than a defined value E, i.e., determining whether the formula (14) is satisfied.

$$|x_{RS,k}|^2 < E \tag{14}$$

In an example, the power checking in step 804 may include: determining whether the absolute value of the real part and the imaginary part of $x_{RS,k}$ is less than the defined value E, i.e., determining whether the formulae (15) and (16) are satisfied at the same time.

$$|\text{real}(x_{RS,k})| < E \tag{15}$$

$$|\text{imag}(x_{RS,k})| < E \tag{16}$$

At step 805, it is judged whether k equals M. If k does not equal M, the procedure in step 806 may be performed. If k equals M, the phase processing may be ended.

At step 806, the k is modified to (k+1), and the procedure in step 801 may be performed.

Further, when the judging result in step 804 indicates the signal power exceeds the threshold, the procedure in step 807 may be performed.

At step 807, it is judged whether in the candidate phase set there is a candidate phase value that has not been tried for the k-th layer user data. If there is such a candidate phase value, the procedure in step 808 may be performed. If there is no such candidate phase value, the procedure in step 809 may be performed.

At step 808, re-selection of the phase compensation value may be performed, and the procedure in step 802 may be performed.

At step 809, it is judged whether k equals 1. If k does not equal 1, the procedure in step 810 may be performed. If k equals 1, the procedure in step 812 may be performed.

At step 801, k may be modified to (k−1). At step 811, re-selection of the phase compensation value may be performed. Then, the procedure in step 802 may be performed. In an example, the procedure in step 807 may be performed after execution of the procedure in step 810. It can be seen that, the step 810 utilizes a rollback mechanism which can also reduce the complexity of phase searching.

At step 812, algorithmic revision may be performed. In an example, the algorithmic revision may include: calculating the cross-correlation between user data of the M layers; for two layers whose user data has a cross-correlation exceeding a pre-defined value, deleting user data of one of the two layers from the M layers of user data, and performing the procedures in steps 801 to 811 again for the user data set after the deletion. For example, when the cross-correlation between user data 1 and user data 3 and the cross-correlation between user data 2 and user data 3 both exceed the pre-defined value, a user data set of (M−1) layers can be obtained by deleting user data 3, and the procedures in steps 801-811 may be performed again on the user data set of (M−1) layers. To ensure fairness, user data 3 may be transmitted using resources such as a subsequent time slot or another frequency band, or the like. It should be noted that, the algorithmic revision may be executed more than once until a group of phase compensation values that meet the power control requirement is found.

In another example, the algorithmic revision may be carried out by setting phase compensation values to 0, and the power control processing of the reference signals of various embodiments may be ended. That is, phase rotation may not be applied to the reference signals. Accordingly, the signal power of the reference signals may be controlled to a certain degree in the stage of power normalization in steps 308 and 608.

In an example, the procedures in step 801 and steps 805-811 may be performed by the phase searching module 606. In an example, the re-selection in steps 808 and 811 refers to using a candidate phase value that has not been tried for the user data of the k-th layer.

In an example, the algorithmic revision may be carried out in a manner which minimizes the maximum output power, and the power control processing of the reference signal in various embodiments may be ended. That is, the selected is a group of phase compensation values which makes a reference signal in user data of a layer that has the maximum output power of reference signal has the minimum output power. The layer that has the maximum output power of reference signal refers to a layer whose reference signal has the maximum output power among the M layers of user data. Accordingly, the signal power of the reference signal may be controlled to a certain degree during power normalization in steps 308 and 608.

It is supposed there are 3 layers of user data, and the candidate phase set is The phase compensation value of the user data of the first layer may first be selected. Since the user data of the first layer does not suffer from interference caused by other users, the candidate phase value 0 can satisfy the requirement of the power control, thus 1/2 π, π and 3/2 π are candidate phase values that have not been tried for the user data of the first layer. During selection of the phase compensation value for user data of the second layer, it may be determined the candidate phase value 0 cannot satisfy the power control requirement while the candidate phase value 1/2 π can satisfy the power control requirement. When proceeding to the selection of the phase compensation value for the user data of the third layer, it may be determined all of the candidate phase values in the candidate phase set cannot satisfy the requirement of the power control, and the processing may rollback to the second layer to re-select a phase compensation value for the user data of the second layer. Then, π and 3/2 π may be respectively tried in phase rotation of the reference signal in user data of the second layer, and it may be found that the candidate phase value 3/2 π can satisfy the power control requirement. Thus, the phase compensation value of the user data of the second layer may be set to 3/2 π, and re-selection of a phase compensation value may be performed for the next layer (i.e., the layer 3 of user data). The searching may be repetitively performed until a phase compensation value that can satisfy the power control requirement is found for each layer of user data, which serves as the final phase compensation value.

In an example, multiple candidate phase sets may be set up. When phase compensation values that satisfy the requirement cannot be found in a first candidate phase set for all layers of user data to control the power of all reference signals, the process as shown in FIG. 8 may be performed using a second candidate phase set. The second candidate phase set may be larger than the first candidate phase set. For example, the first candidate phase set may have a size of 4, the second candidate phase set may have a size of 8. In an example, the first candidate phase set may be In an example, a data signal in user data may be processed through phase rotation at the same time of the phase rotation of the reference signal. That is, in steps 801, 808 and 811, the procedures in steps 610 to 615 of FIG. 6 may be performed after a phase compensation value is selected for user data of the k-th layer. Since the phase compensation value selected in steps 801, 808 and 811 may not be the final phase compensation value, the data signal in the user data of the k-th layer may be processed through the procedures of steps 610 to 615 more than once.

In another example, the procedures in steps 610 to 615 of FIG. 6 may be carried out to precoding the data signals 1 to M after it is determined k equals M in step 805. That is, precoding of the reference signal may be carried out first, and precoding of the data signals may be carried out using the final phase compensation values after the final phase compensation values are found out. The phase searching module 606 may store the phase compensation values for all of the M user data, so that the phase compensation values, which meet the power control requirement, found for the user data of all the layers may be provided for the data signals 1 to M for phase rotation after phase processing of the reference signals.

Figure 9:
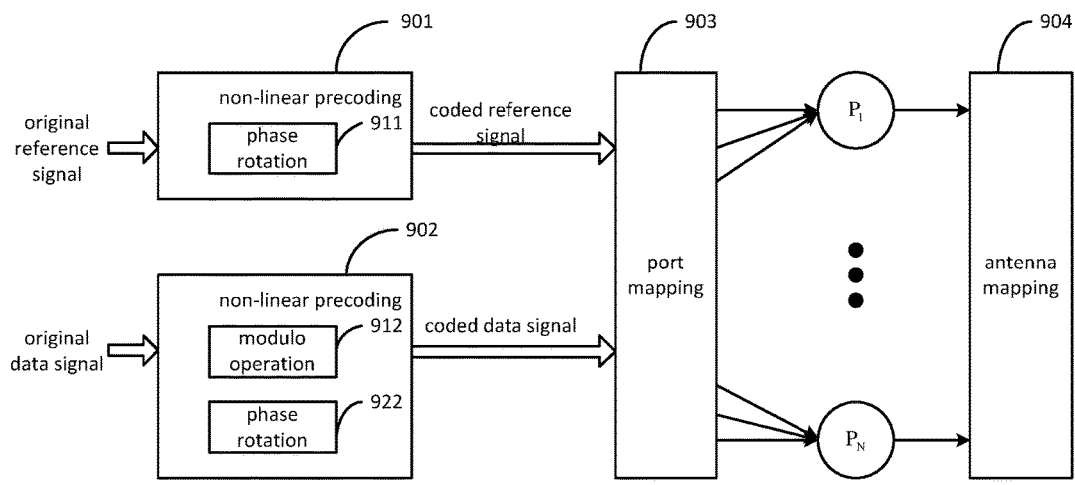
FIG. 9 is a schematic diagram illustrating implementing signal transmission using non-linear precoding in accordance with embodiments of the present application.

FIG. 9 is a schematic diagram illustrating implementing signal transmission using non-linear precoding in accordance with embodiments of the present application. In an example, the non-linear precoding may be the THP scheme.

A base station applies non-linear precoding 901 to an original reference signal to obtain a coded reference signal. Specifically, the non-linear precoding 901 includes processing of the reference signal, such as phase rotation 911, or the like. After the non-linear precoding 902 of the original data signal, a coded reference signal may be obtained. Specifically, the non-linear precoding 902 includes processing of the data signal, such as modulo operation 912, phase rotation 922, or the like. Taking M=K as an example, since the reference signals and the data signals in user data of the K layers have been processed through non-linear precoding, the user data of the K layers may be mapped to N downlink ports (step 903), where N is smaller than or equal to K. It can be seen that, the number of downlink ports, denoted by N, may be smaller than K, i.e., the non-linear precoding may increase spatial re-use rate of downlink ports and reduce reference signal overhead. Further, the user data may be processed through antenna mapping 904 before being transmitted. In an example, the base station may inform the UE of the precoding scheme through downlink control information. Correspondingly, the UE may apply a corresponding modulo operation to received user data after receiving the user data of the K layers.

Figure 10:
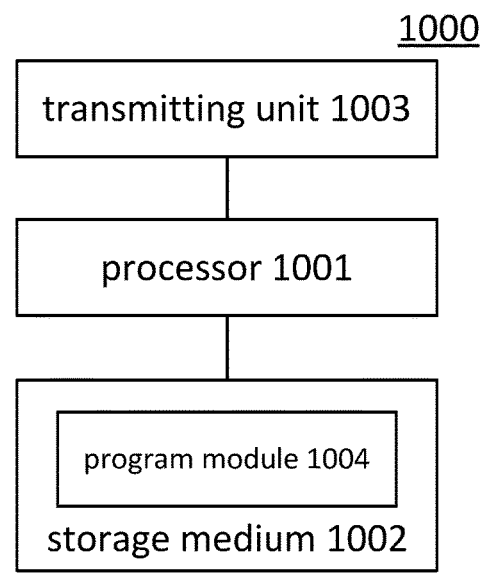
FIG. 10 is a schematic diagram illustrating modules of a base station in accordance with embodiments of the present application.

FIG. 10 is a schematic diagram illustrating modules of a base station 1000 in accordance with embodiments of the present application. In an example, the base station 1000 may include: a processor 1001, non-transitory machine-readable storage medium 1002, and a transmitting unit 1003.

A program module 1004 is stored in the non-transitory machine-readable storage medium 1002, and may be executed by the processor 1001. In an example, the program module 1004 may be configured to: select a phase compensation value for user data of the k-th layer of the base station 1000. At step 502, the reference signal in user data of the k-th layer may be processed through phase rotation according to the phase compensation value to make the reference signal processed through interference cancellation on a transmitter side have a signal power within a pre-defined power threshold. The data signal in the user data of the k-th layer may be modulated using the phase compensation value. In an example, modulating the data signal using the phase compensation value may include: applying phase rotation to the data signal using the phase compensation value, and applying phase rotation to a modulo vector.

In an example, k may be within 1 to K. K is the total number of layers of user data in the wireless communication system. In an example, k may be between 1 and M, and M is smaller than K. That is, the phase rotation may be applied to a portion of user data of all the layers of base station 1000.

The transmitting unit 1003 may be configured to: transmit the reference signal processed through the phase rotation and the modulated data signal. In an example, the transmitting unit 1003 may include an antenna.

In an example, operations performed by the base station 1000 may be similar to those described with reference to FIG. 5, FIG. 6 and the like, and are not elaborated herein.

Figure 11:
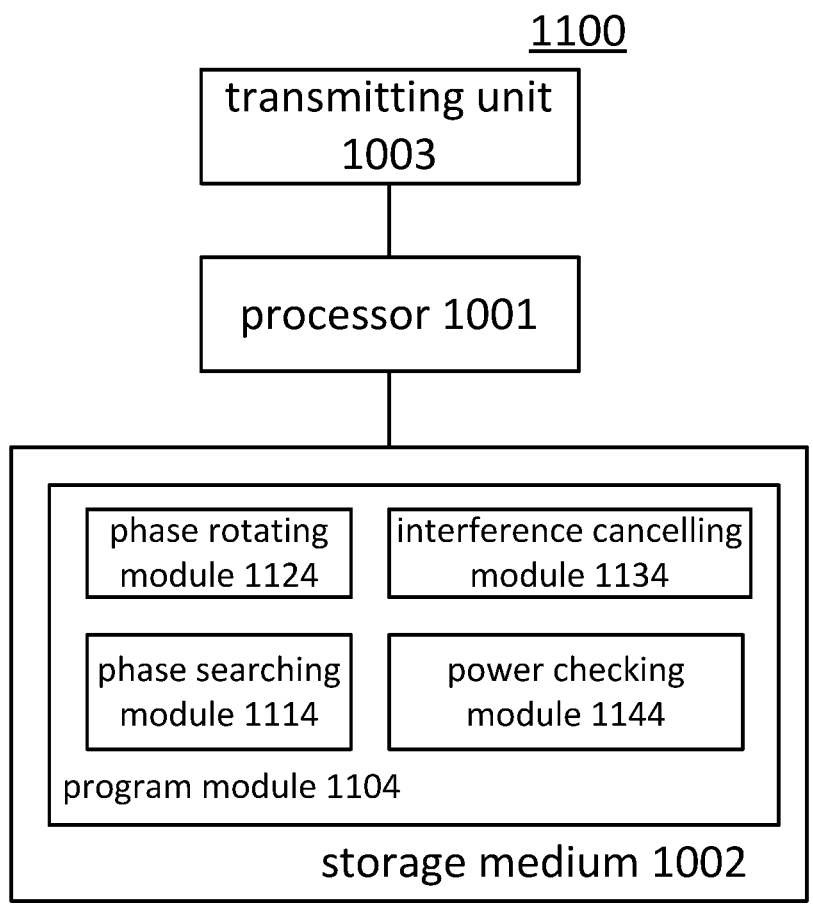
FIG. 11 is a schematic diagram illustrating modules of a base station which performs non-linear precoding in accordance with embodiments of the present application.

FIG. 11 is a schematic diagram illustrating modules of a base station which performs non-linear precoding in accordance with embodiments of the present application. In an example, the base station 1100 may include: a processor 1001, non-transitory machine-readable storage medium 1002, and a transmitting unit 1003.

A program module 1104 may be stored in the non-transitory machine-readable storage medium 1002, and may be executed by the processor 1001. In an example, the program module 1104 may be configured to perform:

A. selecting the phase compensation value for the user data of the k-th layer from a candidate phase set which includes multiple candidate phase values;

B. applying phase rotation to the reference signal in the user data of the k-th layer using the phase compensation value;

C. removing accumulated interference which is suffered by the reference signal in the user data of the k-th layer and caused by reference signals in user data from the first layer to the (k−1)-th layer in the M layers;

D. judging whether the signal power of the reference signal in the user data of the k-th layer processed through interference cancellation exceeds the pre-defined power threshold; and E. when the signal power of the reference signal does not exceed the power threshold, modifying k to be (k+1) and returning to the procedure in step A when k≠M; or ending the process when k=M; when the signal power of the reference signal exceeds the power threshold, re-selecting the phase compensation value and return to the procedure in step B.

Through the above steps A-E, the program module 1104 may find out the final phase compensation value for user data of each layer one by one according to the order of the serial numbers of user data of the M layers.

In an example, the program module 1104 may include the following modules: a phase searching module 1114, a phase rotating module 1124, an interference canceling module 1134 and a power checking module 1144.

The phase searching module 1114 may select the phase compensation value for the user data of the k-th layer from the candidate phase set. In an example, the procedure performed by the phase searching module 1114 may be similar to those in step 306, step 801 and steps 805-811.

The phase rotating module 1124 may apply phase rotation to the reference signal in the user data of the k-th layer using the phase compensation value. In an example, the procedure performed by the phase rotating module 1124 may be similar to those in step 301 and step 802.

The interference canceling module 1134 may remove accumulative interference which is suffered by the reference signal in the user data of the k-th layer and caused by reference signals in user data from the first layer to the (k−1)-th layer in the M layers. In an example, the procedure performed by the interference removing module 1134 may be similar to those in step 302 and step 803.

The power checking module 1144 may judge whether the signal power of the reference signal in the user data of the k-th layer after the interference cancellation exceeds the pre-defined power threshold, and inform the phase searching module 1114 of a result of the judging. The phase searching module 1114 may modify k into (k+1) and selecting the phase compensation value for user data in the (k+1)-th layer from the candidate phase set when the signal power does not exceed the pre-defined threshold. In an example, the procedure performed by the power judging module 1144 may be similar to those in step 305 and step 804.

Figure 12:
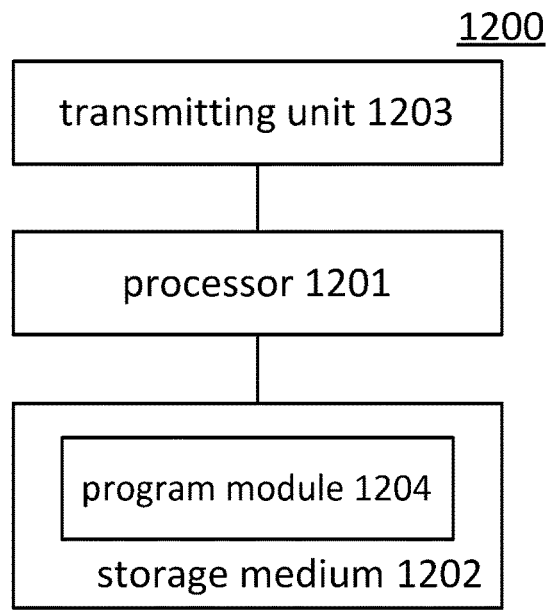
FIG. 12 is a schematic diagram illustrating modules of a UE in accordance with embodiments of the present application.

FIG. 12 is a schematic diagram illustrating modules of UE 1200 in accordance with embodiments of the present application. In an example, the UE 1200 may include: a processor 1201, non-transitory machine-readable storage medium 1202, and a transmitting unit 1203.

A program module 1204 may be stored in the non-transitory machine-readable storage medium 1202, and may be executed by the processor 1201. In an example, the program module 1204 may be configured to: select a phase compensation value for user data of the k-th layer in the UE 1200, apply phase rotation to the reference signal in the user data of the k-th layer to make the signal power of the reference signal processed through interference cancellation within a pre-defined power threshold. In an example, k may be within 1 to K. K is the total number of layers of user data in the UE 1200. In an example, k may be selected from 1 to M, and M is smaller than K. That is, the program module 1204 may apply phase processing to a portion of user data of all the layers.

The transmitting unit 1203 may be configured to transmit the reference signal after the phase rotation. In an example, the transmitting unit 1203 may include an antenna.

In an example, operations performed by the UE 1200 may be similar to those described with reference to FIG. 2, FIG. 3 and the like, and are not elaborated herein.

Figure 13:
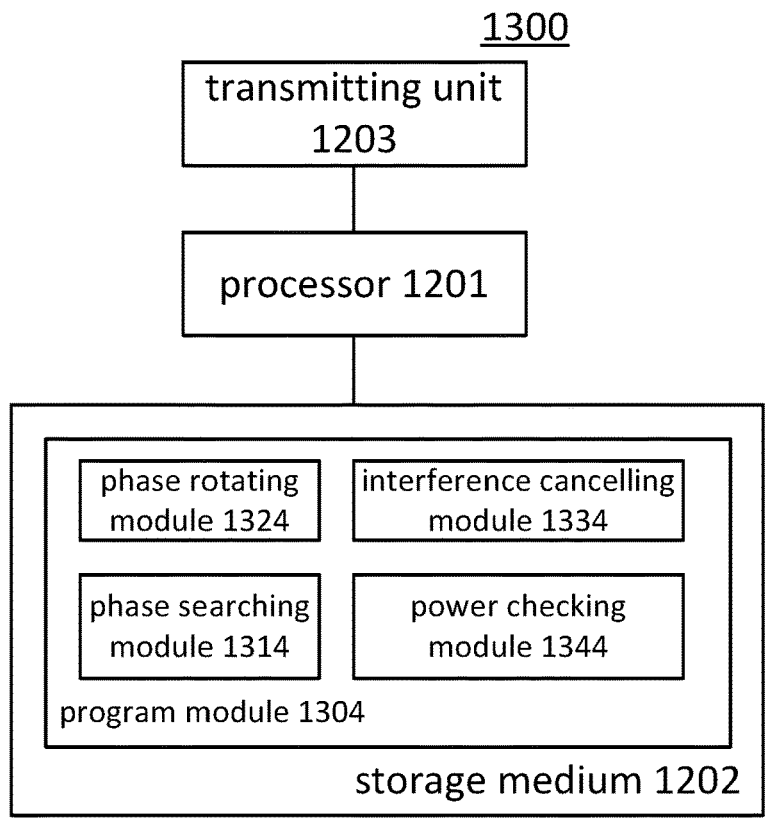
FIG. 13 is a schematic diagram illustrating modules of a UE which applies power control while performing interference cancellation in accordance with embodiments of the present application.

FIG. 13 is a schematic diagram illustrating modules of UE 1300 which applies power control while performing interference cancellation in accordance with embodiments of the present application. In an example, the UE 1300 may include: a processor 1201, non-transitory machine-readable storage medium 1202, and a transmitting unit 1203.

A program module 1304 may be stored in the non-transitory machine-readable storage medium 1202, and may be executed by the processor 1201. In an example, the program module 1304 may be configured to perform:

A. selecting the phase compensation value for the user data of the k-th layer from a candidate phase set which includes multiple candidate phase values;

B. applying phase rotation to the reference signal in the user data of the k-th layer using the phase compensation value;

C. removing accumulated interference which is suffered by the reference signal in the user data of the k-th layer and caused by reference signals in user data from the first layer to the (k−1)-th layer in the M layers;

D. judging whether the signal power of the reference signal in the user data of the k-th layer after the interference cancellation exceeds the pre-defined power threshold; and E. when the power of the reference signal does not exceed the power threshold, modifying k to be (k+1) and returning to the procedure in step A when k≠M; or ending the process when k=M; when the signal power of the reference signal exceeds the power threshold, re-selecting the phase compensation value and return to the procedure in step B.

In an example, the program module 1304 may include the following modules: a phase searching module 1314, a phase rotating module 1324, an interference canceling module 1334 and a power checking module 1344.

The phase searching module 1314 may select the phase compensation value for the user data of the k-th layer from the candidate phase set. In an example, the procedure performed by the phase searching module 1314 may be similar to those in step 801 and steps 805-811.

The phase rotating module 1324 may apply phase rotation to the reference signal in the user data of the k-th layer using the phase compensation value. In an example, the procedure performed by the phase rotating module 1324 may be similar to those in step 802.

The interference canceling module 1334 may remove accumulative interference which is suffered by the reference signal in the user data of the k-th layer and caused by reference signals in user data from the first layer to the (k−1)-th layer in the M layers. In an example, the procedure performed by the interference removing module 1334 may be similar to those in step 803.

The power checking module 1344 may judge whether the signal power of the reference signal in the user data of the k-th layer processed through the interference cancellation exceeds the pre-defined power threshold, and inform the phase searching module 1314 of a result of the judging. The phase searching module 1314 may modify k into (k+1) and selecting the phase compensation value for user data in the (k+1)-th layer from the candidate phase set when the power does not exceed the pre-defined threshold. In an example, the procedure performed by the power judging module 1344 may be similar to those in step 804.

In addition, embodiments of the present application also provide a program capable of making a computer to carry out the methods as shown in FIG. 1, FIG. 2, FIG. 5 and FIG. 8, and non-transitory machine-readable storage medium storing the program.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A signal transmission method in a wireless communication system, comprising:
   selecting a phase compensation value for user data of a k-th layer of the wireless communication system, applying phase rotation to a reference signal in the user data of the k-th layer using the phase compensation value to make the reference signal processed through interference cancellation on a transmitter side have a signal power within a pre-defined power threshold, wherein k is an integer within 1 to M, M is a positive integer smaller than or equal to K; K is the total number of layers of user data in the wireless communication system; and transmitting, via a wireless channel, the reference signal processed through the phase rotation.

2. The method of claim 1, further comprising:
modulating a data signal in the user data of the k-th layer using the phase compensation value, and transmitting the modulated data signal.

3. The method of claim 2, wherein modulating the data signal in the user data of the k-th layer using the phase compensation value comprises:
applying phase rotation to the data signal using the phase compensation value;
applying phase rotation to a pre-configured modulo vector using the phase compensation value; and
applying a modulo operation to the data signal processed through the phase rotation using the modulo vector processed through the phase rotation to obtain the modulated data signal.

4. The method of claim 1, wherein selecting the phase compensation value for the user data of the k-th layer in the wireless communication system, applying the phase rotation to the reference signal in the user data of the k-th layer using the phase compensation value comprise:
A. selecting the phase compensation value for the user data of the k-th layer from a candidate phase set which includes multiple candidate phase values;
B. applying phase rotation to the reference signal in the user data of the k-th layer using the phase compensation value;
C. removing accumulated interference which is suffered by the reference signal in the user data of the k-th layer and caused by reference signals in user data from the first layer to the (k−1)-th layer in the M layers;
D. judging whether signal power of the reference signal in the user data of the k-th layer processed through the interference cancellation exceeds the pre-defined power threshold; and
E. when the signal power of the reference signal does not exceed the power threshold, modifying k to be (k+1) and returning to step A when k≠M; or ending the process when k=M; when the signal power of the reference signal exceeds the power threshold, re-selecting the phase compensation value and returning to step B.

5. The method of claim 4, wherein re-selecting the phase compensation value comprises:
F. re-selecting a phase compensation value for the user data of the k-th layer from candidate phase values that have not been tried for the user data of the k-th layer in the candidate phase set.

6. The method of claim 5, further comprising:
G. when the phase compensation value cannot be found for the user data of the k-th layer in step F, modifying k into (k−1) and returning to step F when k≠1; and performing algorithmic revision and returning to step A when k=1.

7. The method of claim 1, wherein selecting the phase compensation value for the user data of the k-th layer in the wireless communication system comprises:
evenly selecting X candidate phase values from an available phase range to form a candidate phase set, and selecting the phase compensation value for the user data of the k-th layer from the candidate phase set.

8. The method of claim 1, further comprising:
mapping reference signals in user data of M layers to N downlink ports after interference cancellation on a transmitter side, wherein N is smaller than or equal to M.

9. The method of claim 1, wherein selecting the phase compensation value for the user data of the k-th layer in the wireless communication system comprises:
randomly selecting Y candidate phase values from an available phase range to form a candidate phase set, and selecting the phase compensation value for the user data of the k-th layer from the candidate phase set.

10. A device in a wireless communication system, comprising:
a processor;
non-transitory machine-readable storage medium;
a program module stored in the non-transitory machine-readable storage medium, and capable of being executed by the processor; and a transmitting unit;
wherein the program module is configured to:
select a phase compensation value for user data of the k-th layer in the device;
wherein k is an integer within 1 to M, M is a positive integer smaller than or equal to K; K is the total number of layers of user data in the base station;
apply phase rotation to a reference signal in user data of the k-th layer using the phase compensation value to make the reference signal after interference cancellation on a transmitter side have a signal power within a pre-defined power threshold; and
modulate a data signal in the user data of the k-th layer using the phase compensation value;
the transmitting unit is configured to: transmit the reference signal processed through the phase rotation and the modulated data signal.

11. The device of claim 10, wherein the program module is configured to:
A. select the phase compensation value for the user data of the k-th layer from a candidate phase set which includes multiple candidate phase values;
B. apply phase rotation to the reference signal in the user data of the k-th layer using the phase compensation value;
C. remove accumulated interference which is suffered by the reference signal in the user data of the k-th layer and caused by reference signals in user data from the first layer to the (k−1)-th layer in the M layers;
D. judge whether signal power of the reference signal in the user data of the k-th layer processed through the interference cancellation exceeds the pre-defined power threshold; and
E. when the signal power of the reference signal does not exceed the power threshold, modify k to be (k+1) and returning to step A when k≠M; or end the process when k=M; when the signal power of the reference signal exceeds the power threshold, re-select the phase compensation value and return to step B.

12. The device of claim 10, wherein the program module is configured to:
modulate a data signal in the user data of the k-th layer using the phase compensation value, and transmitting the modulated data signal.

13. The device of claim 12, wherein the program module is configured to:
apply phase rotation to the data signal using the phase compensation value;
apply phase rotation to a pre-configured modulo vector using the phase compensation value; and
apply a modulo operation to the data signal processed through the phase rotation using the modulo vector processed through the phase rotation to obtain the modulated data signal.

14. The device of claim 11, wherein the program module is configured to:
  F. re-select a phase compensation value for the user data of the k-th layer from candidate phase values that have not been tried for the user data of the k-th layer in the candidate phase set.

15. The device of claim 14, wherein the program module is configured to:
  G. when the phase compensation value cannot be found for the user data of the k-th layer in step F, modify k into (k−1) and returning to step F when k≠1; perform algorithmic correction and return to step A when k=1.

16. The device of claim 10, wherein the program module is configured to:
  evenly select X candidate phase values from an available phase range to form a candidate phase set, and select the phase compensation value for the user data of the k-th layer from the candidate phase set; or
  randomly select Y candidate phase values from an available phase range to form the candidate phase set, and select the phase compensation value for the user data of the k-th layer from the candidate phase set.

17. The device of claim 10, wherein the program module is configured to:
  map reference signals in user data of M layers to N downlink ports after transmitting end interference cancellation, wherein N is smaller than or equal to M.

18. The device of claim 10, wherein the device is a base station or a user equipment (UE).

19. A non-transitory machine-readable storage medium, storing machine-readable instructions executable by a processor to:
  select a phase compensation value for user data of the k-th layer of a wireless communication system, apply phase rotation to a reference signal in the user data of the k-th layer using the phase compensation value to make the reference signal after interference cancellation on a transmitter side have a power within a pre-defined power threshold, wherein k is an integer within 1 to M, M is a positive integer smaller than or equal to K; K is the total number of layers of user data in the wireless communication system; and
  transmit, via a wireless channel, the reference signal through the phase rotation.

* * * * *